United States Patent [19]

Wolf et al.

[11] Patent Number: 5,031,855
[45] Date of Patent: Jul. 16, 1991

[54] FILM-THRUSTING CASSETTE

[75] Inventors: Michael T. Wolf; Joseph E. Yokajty, both of Rochester; Mark D. Fraser, Brockport, all of N.Y.

[73] Assignee: Eastman Kodak Company, Rochester, N.Y.

[21] Appl. No.: 464,047

[22] Filed: Jan. 12, 1990

[51] Int. Cl.⁵ ............................................. G03B 17/26
[52] U.S. Cl. .................................. 242/71.1; 354/275
[58] Field of Search ....................... 242/71, 71.1, 71.8, 242/71.9, 210, 68.4; 354/216, 275

[56] References Cited

U.S. PATENT DOCUMENTS

| | | |
|---|---|---|
| 988,341 | 4/1911 | Hill . |
| 1,973,457 | 9/1934 | Wittel ......................................... 95/9 |
| 2,336,278 | 12/1943 | Mihalyi ..................................... 95/31 |
| 2,360,255 | 10/1944 | Mihalyi ..................................... 242/71 |
| 2,364,381 | 12/1944 | Mihalyi ..................................... 242/71 |
| 2,521,032 | 9/1950 | Mihalyi et al. ........................... 242/71 |
| 2,541,476 | 2/1951 | Mihalyi ..................................... 242/71 |
| 2,552,200 | 5/1951 | Mihalyi ..................................... 242/71 |
| 3,234,024 | 2/1966 | Leinonen ................................. 96/78 |
| 3,659,799 | 5/1972 | Cerutti et al. ......................... 242/71.9 |
| 3,677,499 | 7/1972 | Wangerin ............................... 242/210 |
| 3,797,777 | 3/1974 | Hosono et al. ....................... 242/197 |
| 4,407,579 | 10/1983 | Huff ...................................... 354/275 |
| 4,423,943 | 1/1984 | Gold ..................................... 354/275 |
| 4,488,796 | 12/1984 | Edwards .............................. 354/275 |
| 4,834,306 | 5/1989 | Robertson et al. ................. 242/71.1 |
| 4,846,418 | 7/1989 | Fairman ............................... 242/71.1 |

FOREIGN PATENT DOCUMENTS 2921379 5/1979 Fed. Rep. of Germany .
926241 9/1947 France .

Primary Examiner—Daniel P. Stodola
Assistant Examiner—John Q. Nguyen
Attorney, Agent, or Firm—Roger A. Fields

[57] ABSTRACT

A film cassette comprises a spool rotatable in unwinding and winding directions to thrust a leader section of a film roll coiled about the spool from the cassette and to return the leader to the cassette; a pair of flanges coaxially arranged along the spool to normally permit each of the flanges to be independently rotated relative to the spool in the two directions and to radially confine the film roll within skirted peripheries of the flanges; and a film stripper received between the leader and the next-inward convolution of the film roll to free the leader from the flanges by inducing the leader to flex the flanges away from one another at their skirted peripheries responsive to rotation of the spool in the unwinding direction. According to the invention, the spool has a pair of integral disks located within the skirted peripheries of the flanges to include the film roll between the disks. At least one of the flanges can be fixed to at least one of the disks to make the fixed flange rotate in unity with the spool when the spool is rotated in the unwinding direction, to improve the ability of the spool to thrust the leader from the cassette. Conversely, the fixed flange can be released from the disk to permit it to be independently rotated relative to the spool when the spool is rotated in the winding direction, to generally ensure the leader will be rewound within the skirted periphery of the flange.

5 Claims, 10 Drawing Sheets

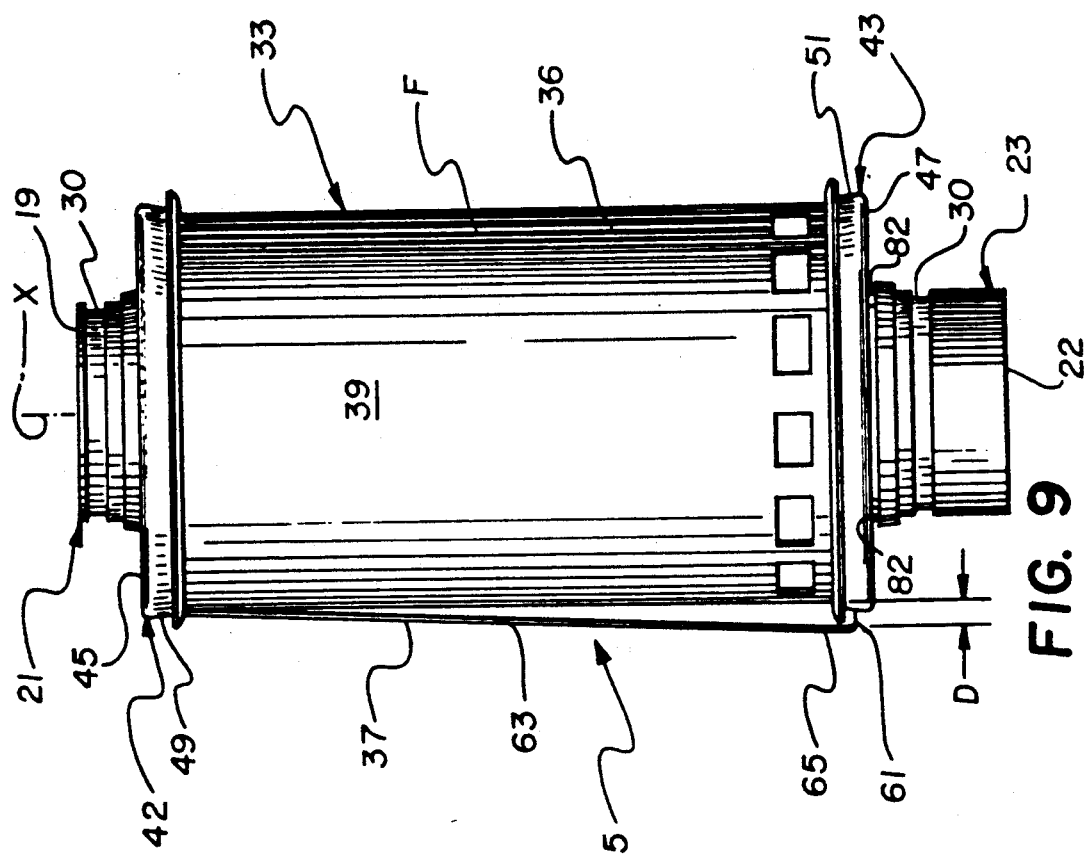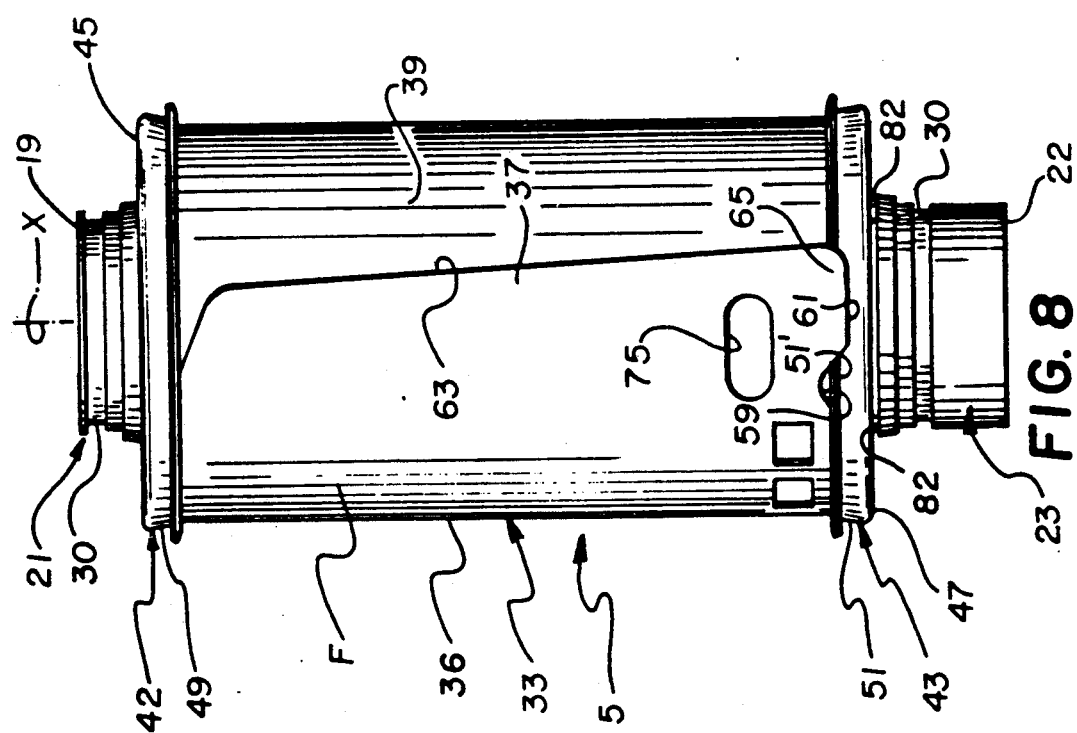

FILM-THRUSTING CASSETTE

CROSS-REFERENCE TO RELATED APPLICATIONS

Reference is made to commonly assigned copending applications Ser. No. 07/320,440, entitled FILM CASSETTE, and filed Mar. 8, 1989 in the name of John J. Niedospial; Ser. No. 07/415,750, entitled FILM CASSETTE, and filed Sept. 27, 1989 in the name of John J. Niedospial; Ser. No. 07/464,048 entitled FILM CASSETTE, and filed Jan. 12, 1990 in the names, of Michael T. Wolf et al.; and Ser. No. 07/464,264 entitled FILM CASSETTE, and filed Jan. 12, 1990, in the names of C. M. McCormick et al.

BACKGROUND OF THE INVENTION

1. Field of the Invention

The invention relates generally to the field of photography, and particularly to a film cassette containing roll film. More specifically, the invention relates to a film cassette that is capable of automatically advancing a non-protruding film leader to the exterior of the cassette shell responsive to unwinding rotation of a film spool within the shell.

2. Description of the Prior Art

In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading or forward-most section of the filmstrip approximately 2⅜ inches long, commonly referred to as a "film leader", normally protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a firm non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader section to draw the filmstrip out of the shell.

A 35 mm film cassette has been proposed which, unlike conventional film cassettes, can be operated to automatically advance a film leader out of the cassette shell by rotating the film spool in the unwinding direction. The film leader originally is located entirely inside the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the forward or leading end of the filmstrip is slightly tapered purportedly to allow it to freely extend from between the circumferential lips and rest against the shell wall at a location inwardly of a non-lightight film passageway to the outside of the cassette shell. During initial unwinding rotation of the film spool, the leading end of the filmstrip is advanced along the shell wall until it reaches an inner entrance to the film passageway. Then, it is advanced into and through the film passageway to the outside of the cassette shell. The passageway has a width that is less than the width of the filmstrip, thus resulting in the filmstrip being transversely bowed as it is uncoiled from the film spool, and thereby facilitating movement of the film edges under the circumferential lips of the flanges. However, severe transverse bowing of the filmstrip in order to move its longitudinal edges under the circumferential lips of the flanges may damage the filmstrip.

Like the type of film cassette disclosed in U.S. Pat. No. 4,423,923, commonly assigned U.S. Pat. Nos. 4,834,306 granted May 30, 1989, and No. 4,848,693, granted July 18, 1989, each disclose a film cassette that is capable of automatically advancing a non-protruding film leader to the outside of the cassette shell in response to rotation of the film spool in the unwinding direction. Specifically, there is disclosed a film cassette wherein a film roll is wound on a spool between a pair of coaxially spaced, independently rotatable flanges. The two flanges have respective circumferential annular lips which prevent the outermost convolution of the film roll, including its leading end, from clock-springing into contact with the interior wall of the cassette shell. When the spool is initially rotated in the unwinding direction, the flanges may momentarily remain stationary and the film roll, since its inner end is secured to the spool, tends to expand radially to ensure a firm non-slipping relation between the outermost convolution and the annular lips. Once the non-slipping relation exists, continued rotation of the spool will similarly rotate the flanges. This allows stationary internal spreaders to deflect successive portions of the annular lips to an axial dimension exceeding the film width, in turn allowing the leading end and successive sections of the film roll to be freed from the radial confinement of the annular lips and to be advanced into and through a lighttight film passageway to the outside of the cassette shell. A stripper-guide located adjacent an inner entrance to the film passageway diverts the leading end of the film roll into the passageway by being received between the leading end and the next-inward convolution of the film roll responsive to unwinding rotation of the spool.

THE CROSS-REFERENCED APPLICATIONS

Cross-referenced applications Ser. Nos. 07/320,440 and 07/415,750 each disclose a film cassette wherein a film roll whose outermost convolution is a film leader is coiled about a spool rotatable within the cassette shell, a pair of flexible independently rotatable flanges are coaxially arranged on the spool to radially confine the film leader within respective skirted peripheries of the flanges to prevent the leader from substantially contacting an interior wall of the cassette shell, and a film stripper-guide projecting from the interior wall is received between a leading end of the film leader and the next-inward convolution of the film roll to free the leader from the flanges and guide the leader through a lighttight film passageway to the exterior of the cassette shell responsive to rotation of the spool in a film unwinding direction. Specifically, the stripper-guide frees the film leader from the flexible flanges by inducing the leader to flex the flanges away from one another at their skirted peripheries during unwinding rotation of the spool. Moreover, the film leader and at least one of the flanges include mutual engagement means for maintaining the leading end of the leader spaced at least a minimum radial distance from the next-inward convolution of the film roll sufficient to locate the leading end within range of the stripper-guide, to ensure that the leading end will be advanced over the stripper-guide responsive to rotation of the spool in the film unwinding direction.

SUMMARY OF THE INVENTION

According to the invention, it has been found that by fixing at least one of the film confining flanges to the film spool during unwinding rotation of the spool, as contrasted with allowing each of the flanges to remain rotatable independently of the spool as in commonly assigned U.S. Pat. Nos. 4,834,306 and 4,848,693 and in cross-referenced applications Ser. Nos. 07/320,440 and 07/415,750, there is immediately effected a frictional relationship between the outermost convolution of the film roll and the skirted periphery of the fixed flange which improves the ability of the spool to thrust the film leader through the lighttight passageway to the exterior of the cassette shell. In particular, the frictional relationship increases the pushing force the spool will apply to the film leader to propel the leader out of the cassette shell. Moreover, it has been found that by allowing both of the flanges to be rotated independently of the spool during winding rotation of the spool, as in commonly assigned U.S. Pat. Nos. 4,834,306 and 4,848,693 and in cross-referenced applications Ser. Nos. 07/320,440 and 07/415,750, it is substantially ensured that the leader can be rewound within the skirted peripheries of the flanges without being obstructed by the skirted peripheries.

Thus, the invention may be summarized as follows:

A film cassette comprising (a) a spool rotatable in a film unwinding direction to thrust a leader section of a film roll coiled about the spool to the exterior of the cassette and in a film winding direction to return the leader to the interior of the cassette, and (b) a pair of flanges coaxially arranged along the spool to normally permit each of the flanges to be independently rotated relative to the spool in the film unwinding and film winding directions and to radially confine the film roll within skirted peripheries of the flanges, is characterized by including:

a pair of disks axially spaced along the spool in a fixed relation to the spool, with respective outer faces of the disks located adjacent corresponding inner faces of the flanges to position the disks within the skirted peripheries of the flanges to include the film roll between the disks; and securement means for securing one of the flanges in face-to-face contact to one of the disks to make the flange rotate in unity with the spool when the spool is rotated in the film unwinding direction, to improve the ability of the spool to thrust the leader from the cassette, and for releasing the flange from the disk to permit the flange to be independently rotated relative to the spool when the spool is rotated in the film winding direction, to substantially ensure the leader can be rewound within the skirted periphery of the flange.

BRIEF DESCRIPTION OF THE DRAWINGS

FIGS. 8 and 9 are elevation views of the film roll and the film spool, illustrating the manner in which the film roll is originally stored on the film spool;

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
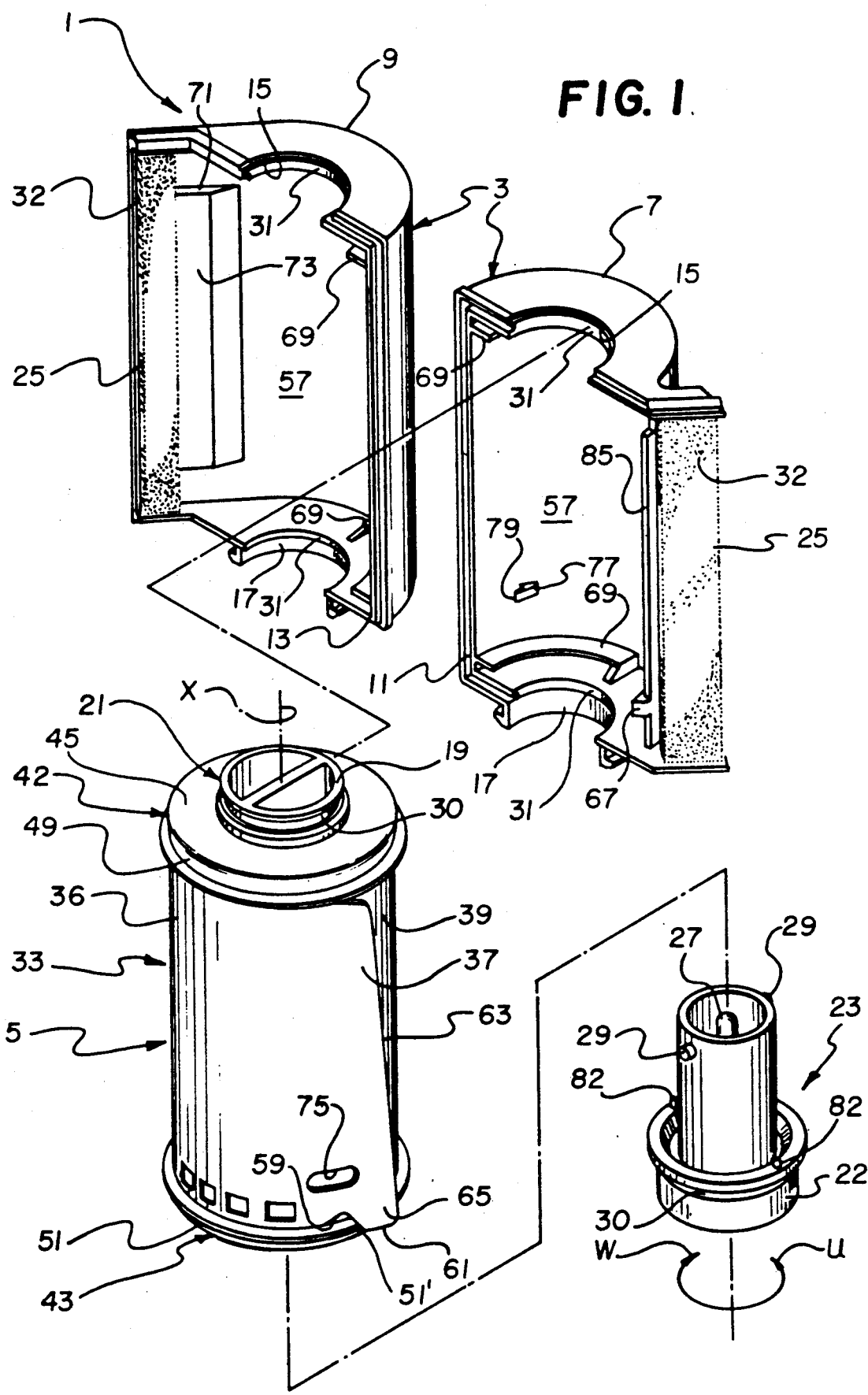
FIG. 1 is an exploded perspective view of a film cassette according to a preferred embodiment of the invention.
Figure 2:
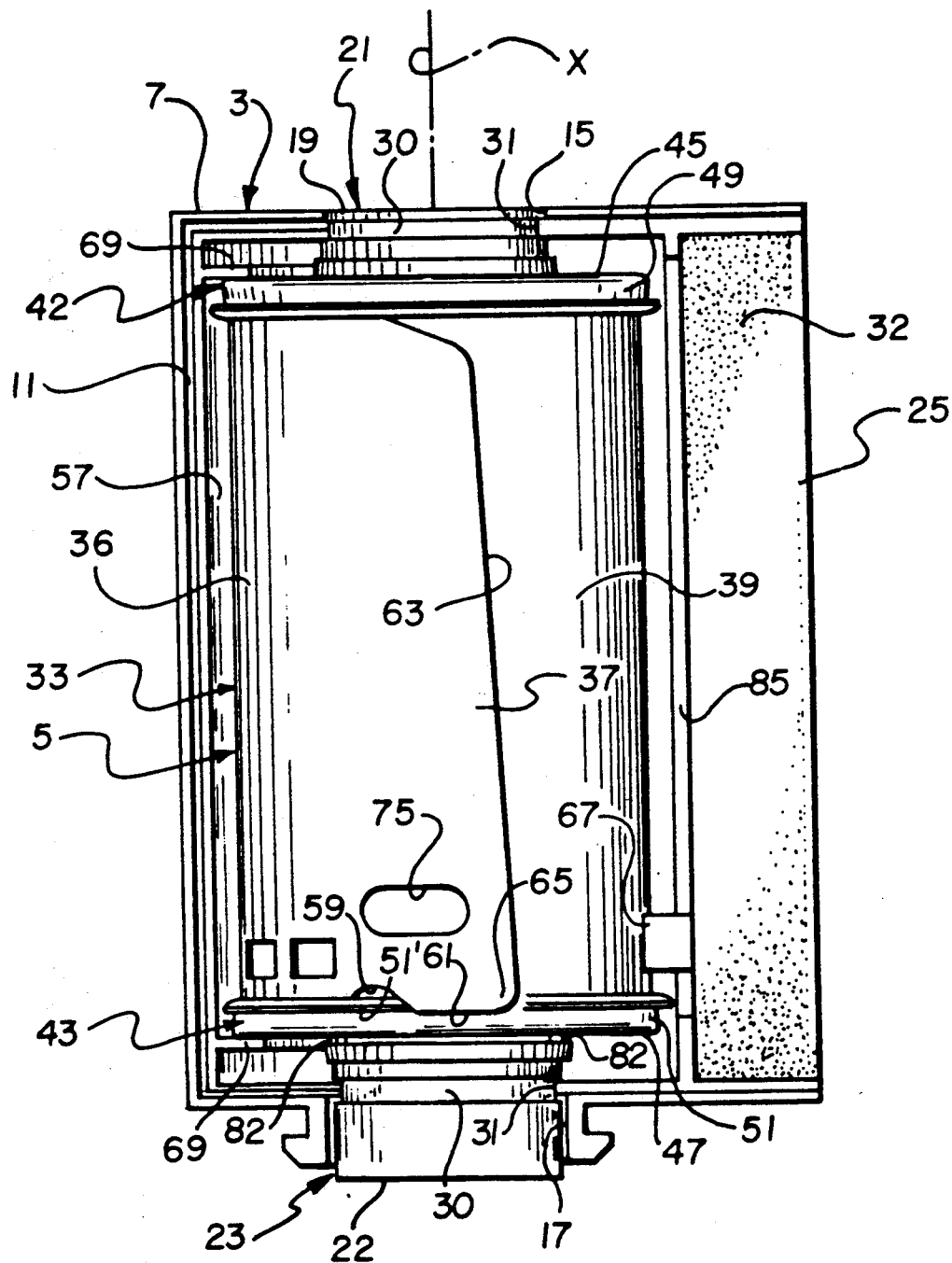
FIG. 2 is an elevation view of the film cassette, illustrating the cassette shell open to reveal a film roll coiled about a film spool.
Figure 12:
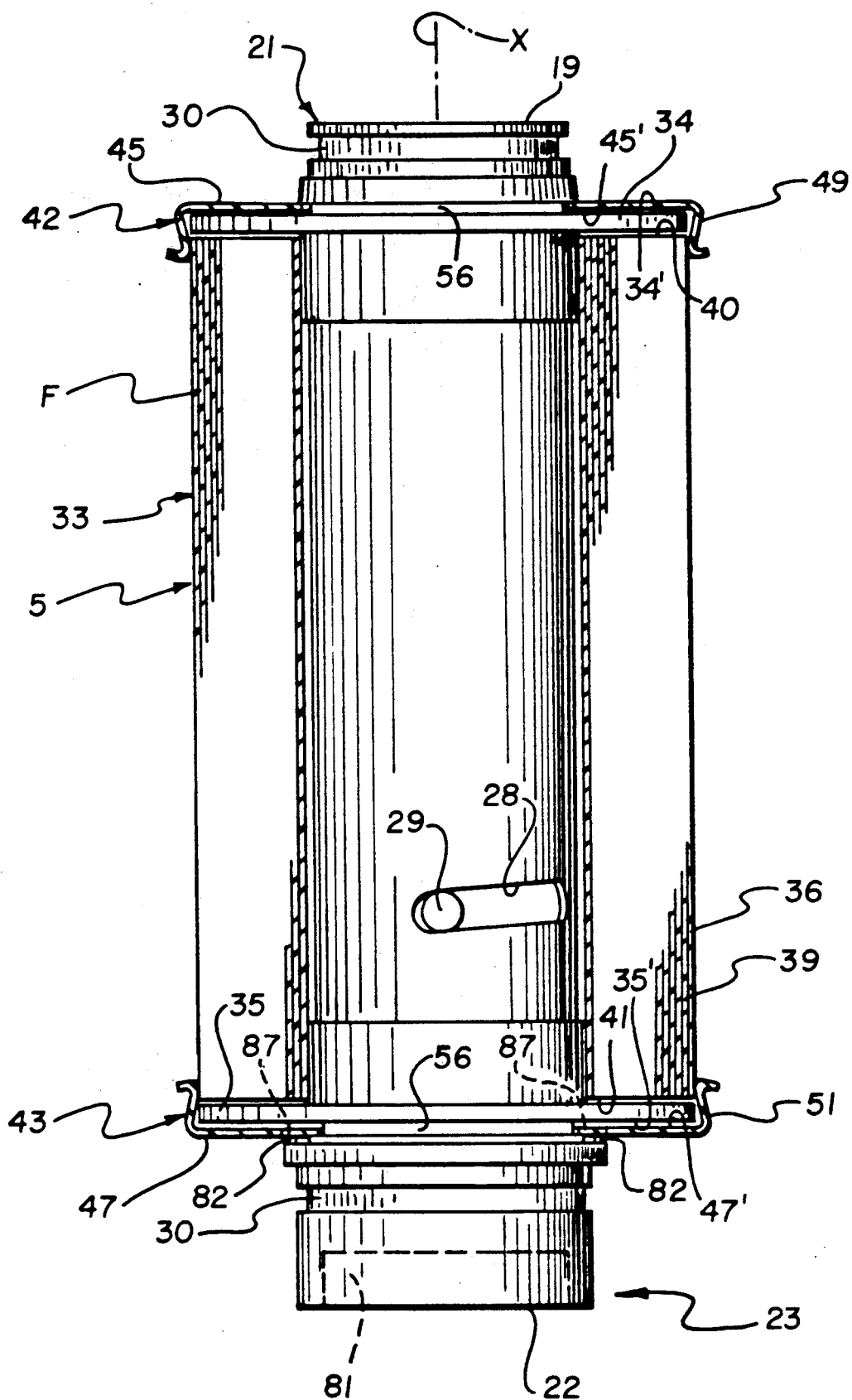
FIGS. 12 and 13 are elevation views, partly in section, of the film roll and the film spool, illustrating the manner in which one of a pair of film confining flanges of the spool may be fixed to the spool for concurrent rotation with the spool.
Figure 13:
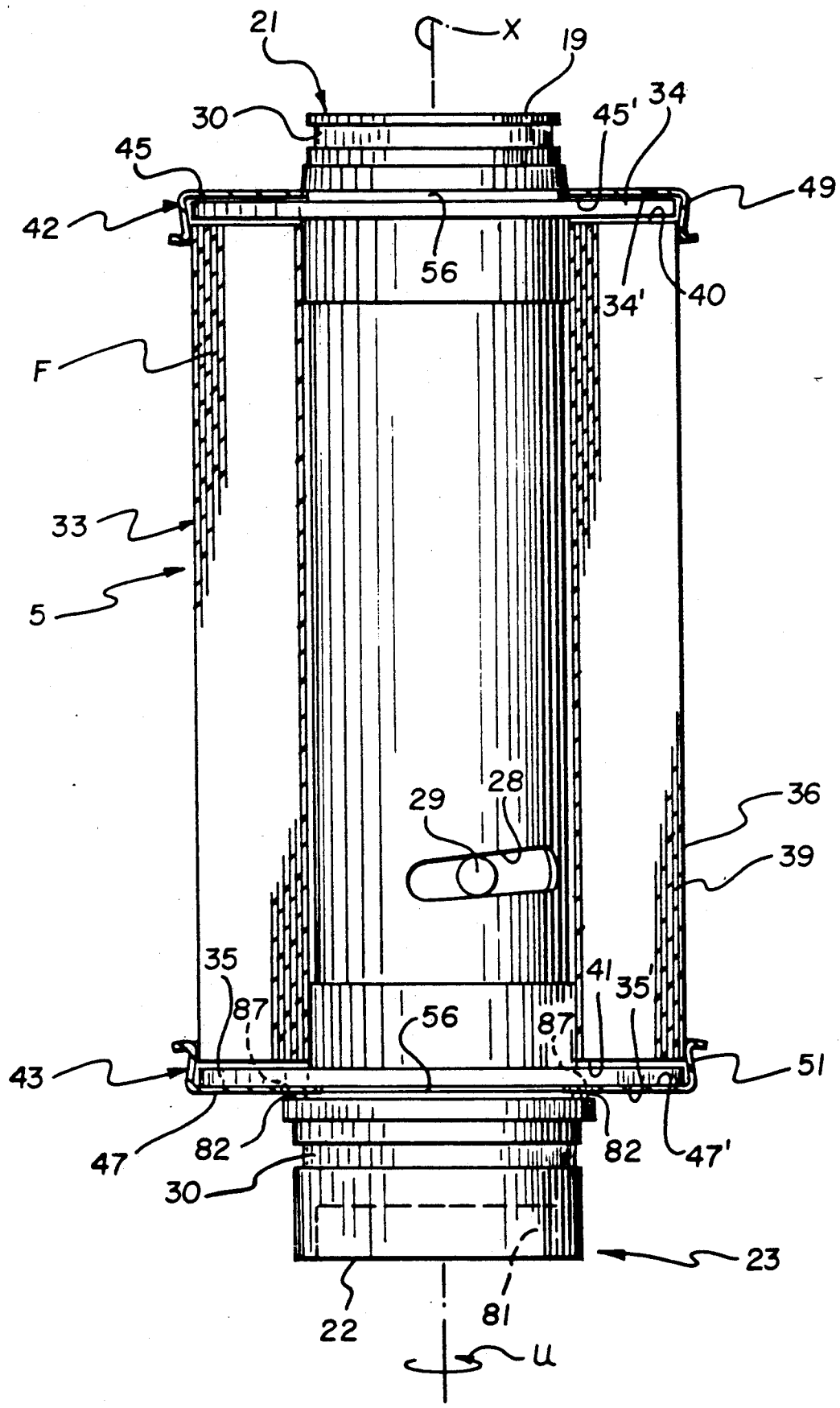

Referring now to the drawings, FIGS. 1, 2 and 12 depict an improved 35 mm film cassette 1 comprising a lighttight cassette shell 3 and a film spool 5 which is rotatable about an axis X in film unwinding and film winding directions U and W within the cassette shell. The cassette shell 3 consists of two shell halves 7 and 9 which are mated along respective grooved and stepped edge portions 11 and 13. The mated halves 7 and 9 define respective upper and lower aligned circular openings 15 and 17 for an outer open end 19 of a spool core or hub 21 and an outer open end 22 of a securement member 23, and they define a narrow relatively-straight film passageway 25 to the exterior of the cassette shell 3. The securement member 23 is supported via an inner integral spindle 27, received in a coaxial bore (not shown) in the spool core 21, for rotation relative to the spool core in the film unwinding and film winding directions U and W and for translation telescopically inward and outward along the spool core in opposite directions. The spool core 21 has two opposite facing inclined cam slots 28 cut in its periphery which contain respective follower pins 29 radially projecting from the securement member 23, to limit rotation and translation of the securement member relative to the spool core. The spool core 21 and the securement member 23 each include an annular groove 30 which mates with a corresponding edge portion 31 of the respective openings 15 and 17 to rotatably support the film spool 5 for rotation about the axis X in the film unwinding and film winding directions U and W. A known black velvet or plush material 32 lines the interior of the film passageway 25 to prevent ambient light from entering the film passageway.

Figure 3:
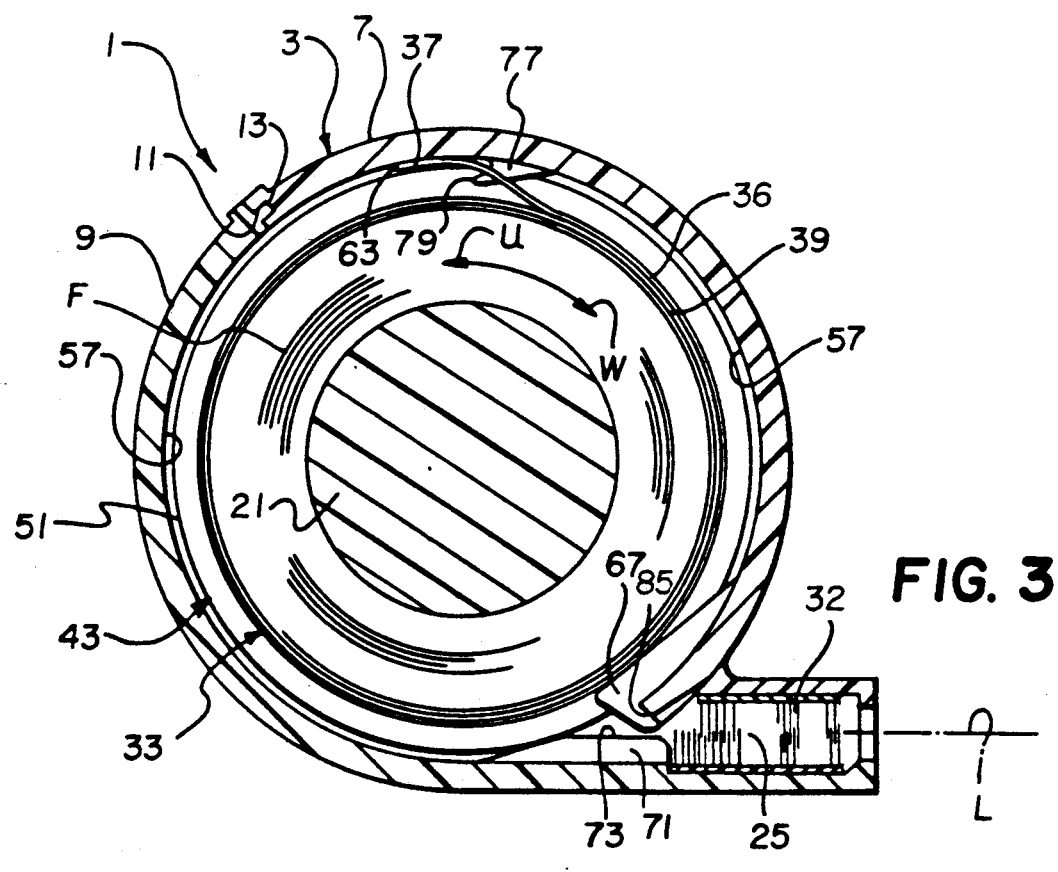
FIG. 3 is an end view partly in cross-section of the cassette shell, the film roll and the film spool, illustrating the manner in which the film roll is originally stored on the film spool.
Figure 5:
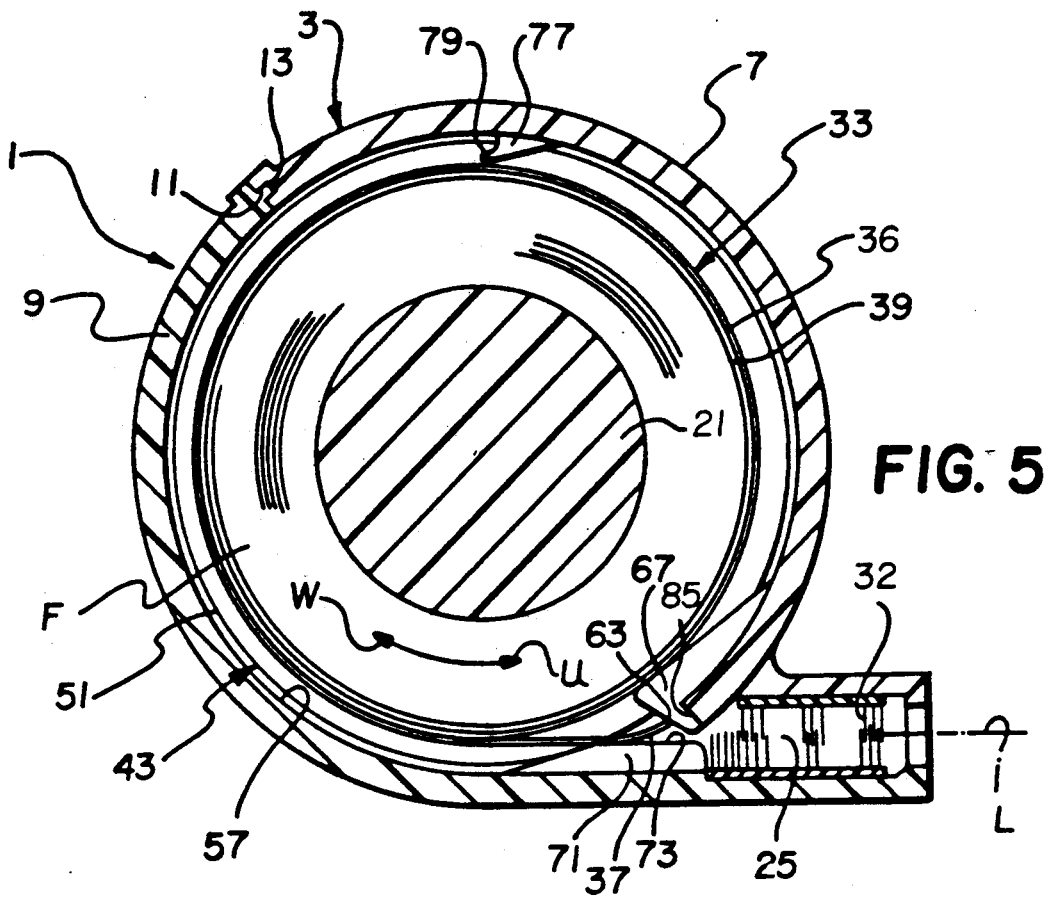

A roll 33 of 35 mm filmstrip F is coiled about the spool core 21 between a pair of coaxial rigid disks 34 and 35, preferably integrally formed with the spool core, to form successive film convolutions. As shown in FIG. 3, the film roll 33 includes an outermost convolution which comprises a film leader 36 having a leading or forward end section 37, and it includes a next-inward convolution 39 coiled behind the outermost convolution. The inner or trailing end section of an innermost convolution (not shown) of the film roll 33 is secured to the spool core 21. The two disks 34 and 35 cover opposite sides of the film roll 33 which are defined by corresponding opposite longitudinal edges 40 and 41 of each successive convolution of the film roll. See FIG. 12.

A pair of upper and lower identical, very thin, flexible film confining flanges 42 and 43 are coaxially spaced along the spool core 21 as shown in FIGS. 1, 2, 12 and 13. The two flanges 42 and 43 comprise respective flat portions 45 and 47 and respective integral annular lips or skirts 49 and 51 which circumferentially extend from the flat portions. The two flat portions 45 and 47 have respective inner faces 45' and 47' which are located adjacent corresponding outer faces 34' and 35' of the core disks 34 and 35 to allow the annular lips 49 and 51 to circumferentially overlap the peripheral edges of the core disks, and they have respective central holes (not shown) through which the spool core 21 axially extends. The spool core 21 as shown in FIG. 12 has respective circumferential grooves 56 for supporting the flanges 42 and 43 in the grooves to permit the flanges to be independently rotated relative to the spool core in the film unwinding and film winding directions U and W. The annular lips 49 and 51 overlap the film leader (outermost convolution) 36 of the film roll 33 radially outwardly of the longitudinal edges 40 and 41 of the leader to radially confine the leader to thus prevent it from radially expanding or clock-springing into substantial contact with an interior curved wall 57 of the cassette shell 3. See FIG. 2. A lip-receiving notch 59 is cut in the film leader (outermost convolution) 36 along its longitudinal edge 41, relatively close to its leading end 37, to receive a peripheral section 51' of the annular lip 51. This allows a relatively short edge-section 61 of the film leader (outermost convolution) 36 connecting the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward edge 63 inclined from the longitudinal edge 40 of the film leader (outermost convolution) 36 to the other longitudinal edge 41 of the leader to form a forward-most tip or tab 65 of the leader which, like the edge-section 61, overlaps the annular lip 51 radially outwardly. See FIGS. 1, 2, 8 and 9.

Figure 4:
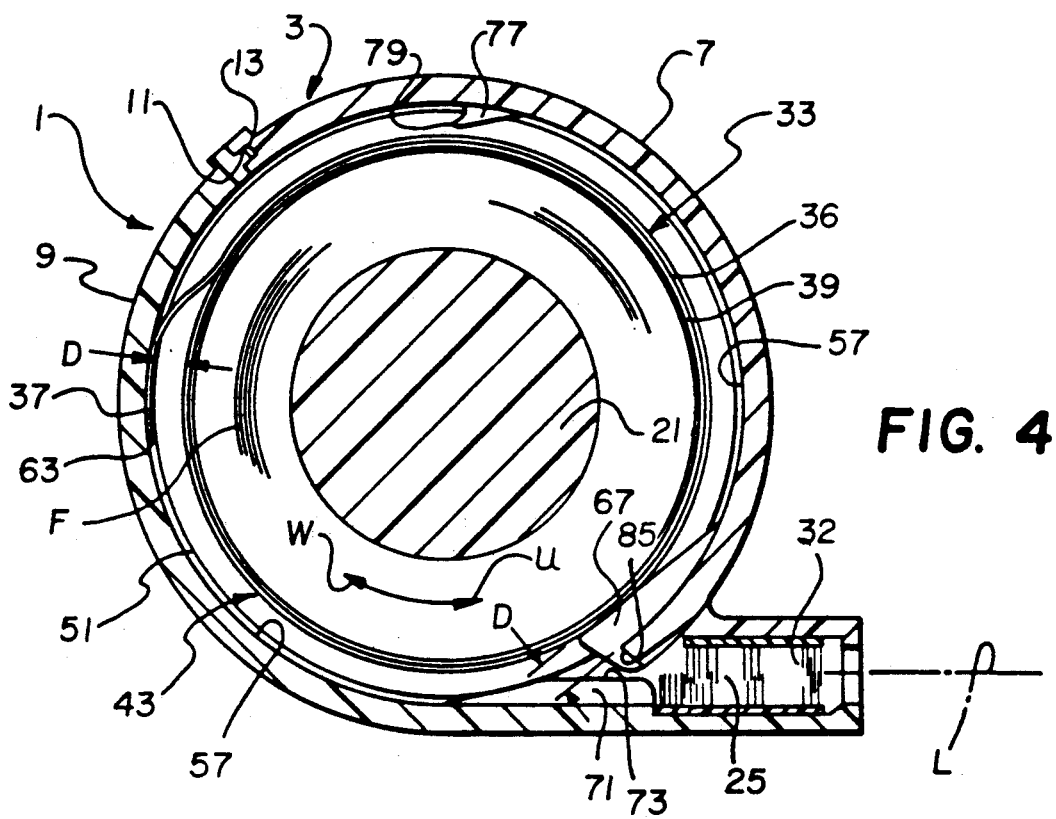
FIGS. 4, 5, 6 and 7 are end views similar to FIG. 3, illustrating the manner in which the film roll is unwound from the film spool.

A film stripper-guide 67 projecting from the interior wall 57 of the cassette half 7 is positioned immediately inward of the inner entrance to the film passageway 25 to be received between the leading end 37 of the film leader (outermost convolution) 36 and the next-inward convolution 39, close to the forward-most tip 65 of the leader, to pick up the leading end and guide it into the film passageway responsive to rotation of the spool core 21 in the unwinding direction U. See FIGS. 1, 4–7, 10 and 11. The leading end 37 will be advanced over the stripper-guide 67 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 67 due to such spacing D from the next-inward convolution 39.

When the leading end 37 of the film leader (outermost convolution) 36 is advanced over the stripper-guide 67 responsive to rotation of the spool core 21 in the unwinding direction U, the longitudinal edges 40 and 41 of the leader start to gently flex respective arcuate portions of the two flanges 42 and 43 axially away from one another, first to allow the notch 59 to separate from the lip section 51', and then to allow successive longitudinal sections of the leader to exit from between the flanges to the outside of the cassette shell 3. See FIGS. 10 and 11. The local flexing of the flanges 42 and 43 occurs because the film width $W_F$ between the longitudinal film edges 40 and 41 is slightly greater than the axial spacing $A_S$ between the annular lips 49 and 51 of the flanges. Moreover, successive convolutions of the film roll 33 have a resistance to transverse bowing that is greater than the resistance of the flanges 42 and 43 to be locally flexed. A pair of flat curved bearing members 69 extend from the interior wall 57 of the cassette shell 3 to lie flatly against successive arcuate sections of the two flat portions 45 and 47 of the flanges 42 and 43 as the flanges are locally flexed axially away from one another, to thereby assure return of the flexed sections of the flanges to their normal original non-flexed condition. See FIGS. 1 and 2.

A film flattening member 71 projects from the interior wall 57 of the cassette half 9 in the vicinity of the inner entrance to the film passageway 25 and the stripper-guide 67 to support successive longitudinal sections of the film leader 36, beginning with its leading end 37, substantially flat as those sections are freed from the flanges 42 and 43, to facilitate movement of the leading end into the passageway. See FIGS. 6 and 7. The light-trapping plush 32 within the film passageway 25 is elevated along the passageway slightly beyond a longitudinal center line L of the passageway. The film flattening member 71 as shown in FIG. 3 projects almost to the center line L in order to support successive sections of the film leader 36 substantially flat at the center line. See FIGS. 6 and 7. Preferably, a substantially planar film-supporting face 73 of the flattening member 71 is spaced 0.005"–0.030" short of the center line L, and extends widthwise of the film passageway 25 as shown in FIG. 1.

A slot 75 is cut in the film leader (outermost convolution) 36 substantially proximate its leading end 37. A tooth 77 fixed to the interior wall 57 of the cassette half 7 has a free pointed end 79 which is positioned to be received in the slot 75 to thus engage the film leader (outermost convolution) 35, when the spool core 21 is rotated in the winding direction W as shown in FIG. 3, and to exit the slot to thus disengage the leader, when the spool core is rotated in the unwinding direction U as shown in FIG. 4. The engagement of the film leader (outermost convolution) 36 and the tooth 77 responsive to rotation of the spool core 21 in the winding direction W prevents the leading end 37 of the leader from coming to rest between the stripper-guide 67 and the next-inward convolution 39.

OPERATION

Figure 6:
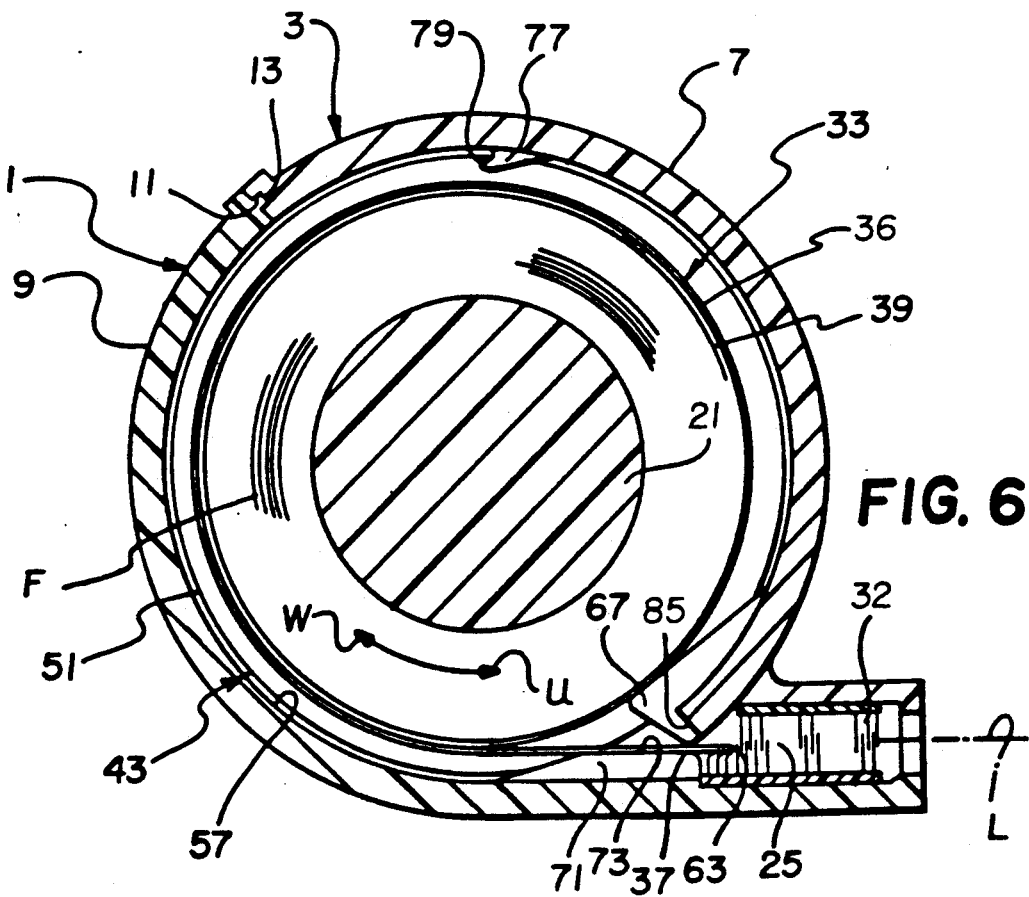
Figure 7:
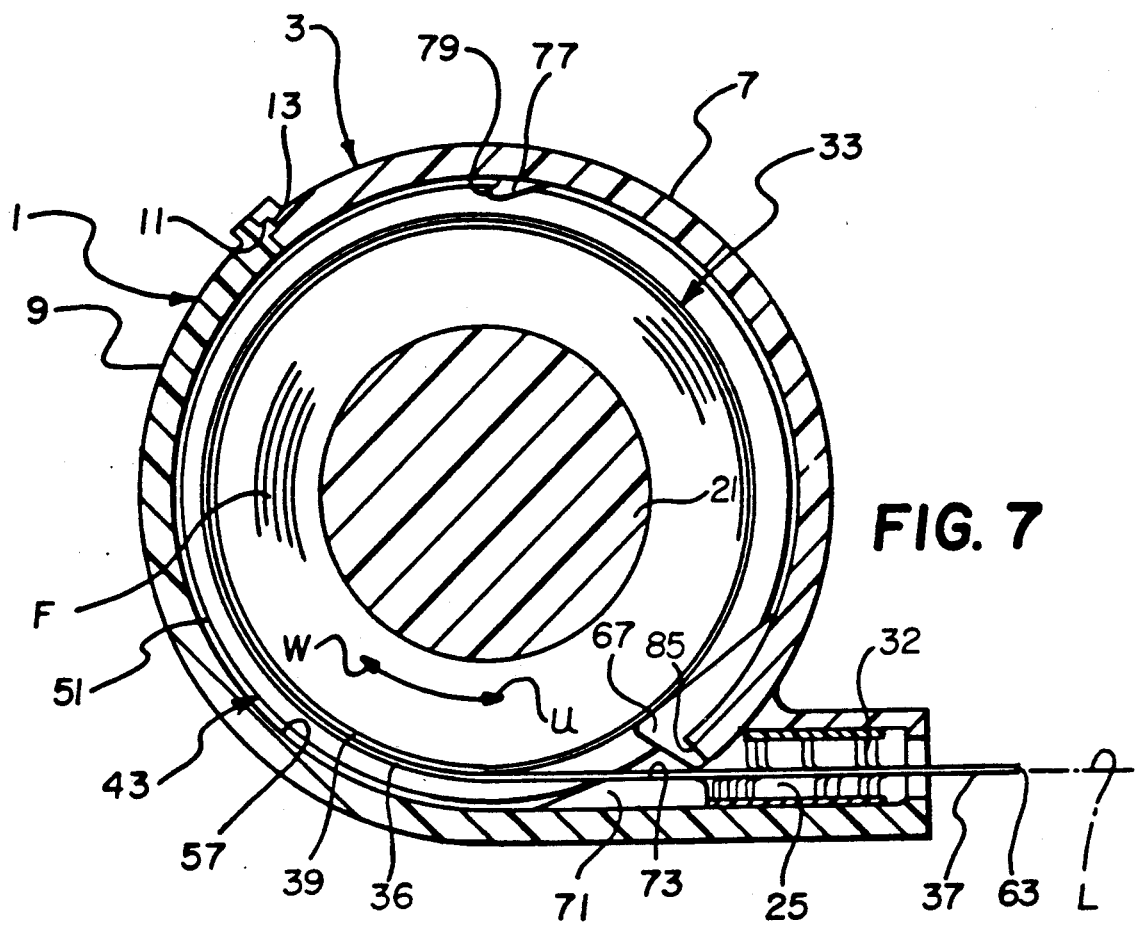
Figure 10:
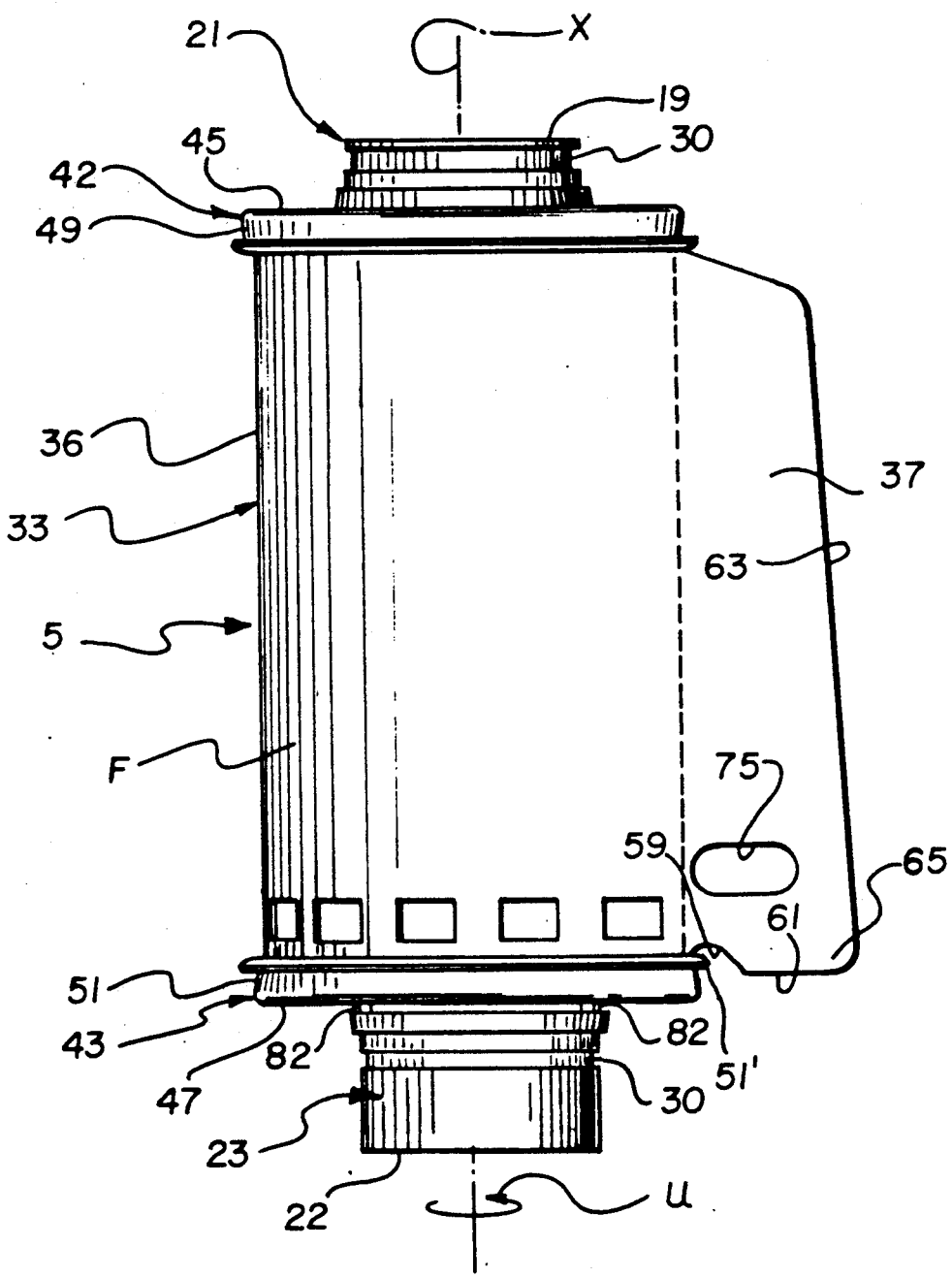
FIGS. 10 and 11 are elevation views similar to FIGS. 8 and 9, illustrating the manner in which the film roll is unwound from the film spool.
Figure 11:
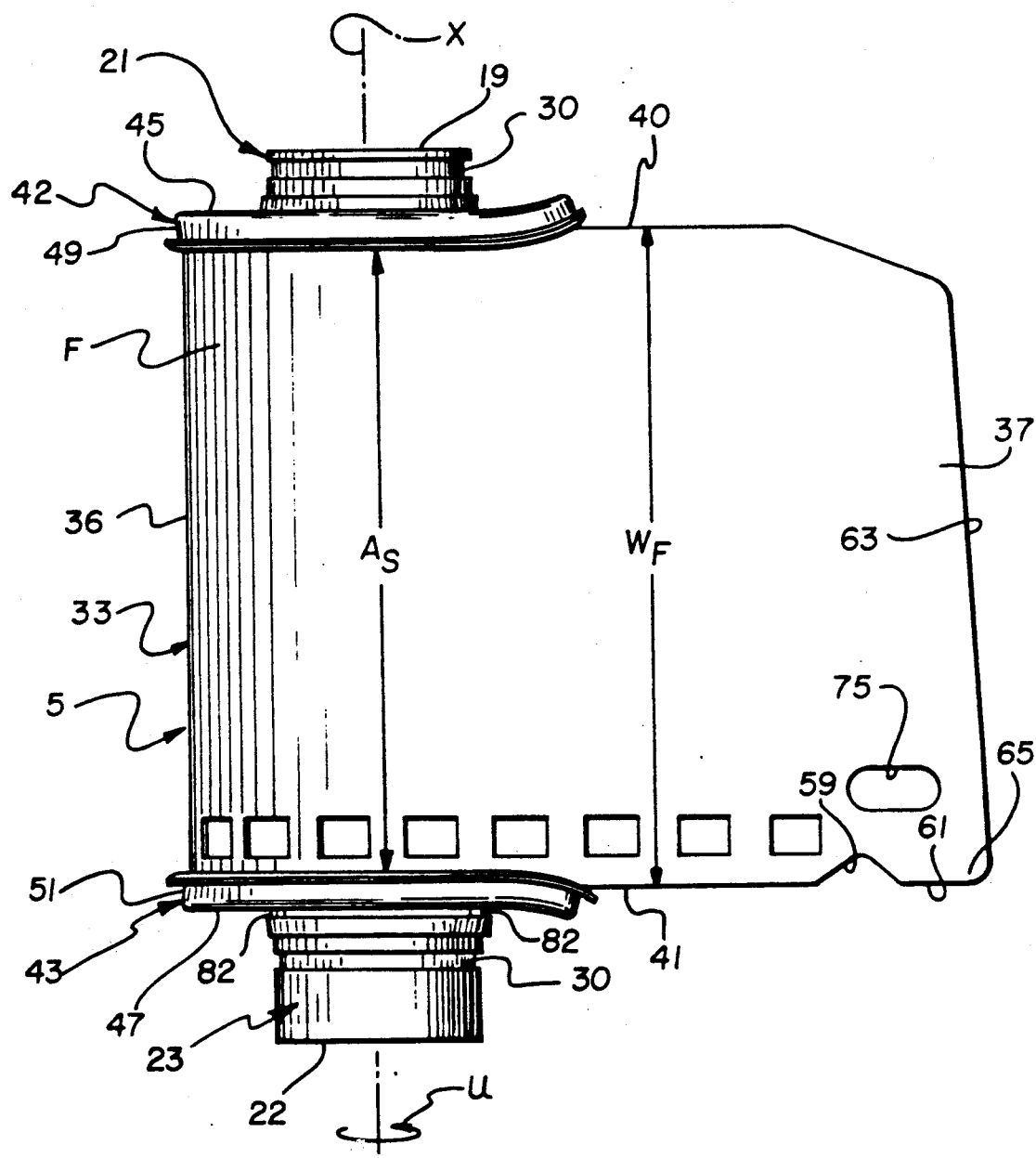

If the securement member 23 is initially rotated relative to the spool core 21 in the film unwinding direction U, for example by engaging a keying member 81 within the open end 22 of the securement member, the cam slots 28 in the spool core will cooperate with the follower pins 29 of the securement member to translate the securement member telescopically inward along the spool core to, in turn, pinch or clamp the flat portion 47 of the flange 43 between two drive lugs 82 of the securement member and the outer face 35' of the core disk 35. See FIGS. 12 and 13. In essence, the flat portion 47 of the flange 43 and the core disk 35 will be secured frictionally in face-to-face contact. Then, further rotation of the securement member 23 in the film unwinding direction U will similarly rotate the spool core 21 and the flange 43 in the same direction. See FIGS. 4-7, 10 and 11. As a result, the film leader (outermost convolution) 36 will be advanced off the tooth 77 and its leading end 37 will be advanced over the stripper-guide 67, causing successive arcuate portions of the flanges 42 and 43 to be flexed axially away from one another as shown in FIG. 11. This first allows the notch 59 in the film leader (outermost convolution) 36 to separate from the lip section 51' of the flange 43, and then it allows successive longitudinal sections of the film leader to exit from between that flange and the flange 42 to the outside of the cassette shell 3. Since the stripper-guide 67 initially picks up the leading end 37 of the film leader 36 close to its forward-most tip 65, the forward edge 63 of the leading end might initially be supported along a narrow ridge 85 forming one end of the interior wall 57 of the cassette half 7. However, the leading end 37 will tend to back away from the ridge 85 and move against the film-supporting face 73 of the flattening member 71 as shown in FIG. 6.

If the securement member 23 is rotated relative to the spool core 21 in the film winding direction W, for example by engaging its keying member 81, after some length of the filmstrip F has been advanced from the cassette shell 3, the cam slots 28 will cooperate with the follower pins 29 to translate the securement member telescopically outward along the spool core to, in turn, release or unclamp the flat portion 47 of the flange 43 by separating the two drive lugs 82 from the flat portion, to thereafter permit the flange to be rotated independently of the spool core. Then, further rotation of the securement member 23 in the film winding direction W will similarly rotate the spool core 21 in the same direction to rewind the filmstrip F onto the spool core. The spool core 21 is rotated in the film winding direction W substantially until the slot 75 in the film leader (outermost convolution) 36 receives the free end 79 of the tooth 77 to thereby re-engage the film leader to the tooth.

According to the invention, it has been found that by securing the flange 43 frictionally in face-to-face contact to the core disk 35 during unwinding rotation of the spool core 21, as contrasted with allowing that flange to remain rotatable independently of the spool core as in commonly assigned U.S. Pat. Nos. 4,834,306 and 4,848,693, there is immediately effected a frictional relationship between the film leader (outermost convolution) 36 and the skirted periphery 51 of the flange which improves the ability of the film spool to thrust the film leader through the lighttight passageway 25 to the exterior of the cassette shell 3. In particular, the frictional relationship increases the pushing force the spool core 21 will apply to the film leader 36 to propel the leader out of the cassette shell 3. Moreover, it has been found that by allowing both of the flanges 42 and 43 to be rotated independently of the spool core 21 during winding rotation of the film spool 5, as in commonly assigned U.S. Pat. Nos. 4,4834,306 and No. 4,848,693, it is substantially ensured that the leader can be rewound within the skirted peripheries 49 and 51 of the flanges without being obstructed by the skirted peripheries.

When the flange 43 is secured frictionally in face-to-face contact to the core disk 35, it might be possible that the flange could be forcibly rotated relative to the spool core 21 [in the film unwinding direction U]. For this reason, there is provided a pair of aligned radial slots 87 cut in the flange 43 for receiving the respective drive lugs 82 of the securement member 23, to affirmatively couple the flange and the securement member, responsive to rotation of the securement member relative to the flange in the film unwinding direction U. In essence, the cooperation of the cam slots 28 and the follower pins 29 to translate the securement member 23 telescopically inward along the spool core 21 to, in turn, clamp the flange 43 between the drive lugs 82 and the core disk 35 will serve to move the drive lugs into the radial slots 87 of the flange. Conversely, when the securement member 23 is first rotated relative to the spool core 21 in the film winding direction W, the cooperation of the cam slots 28 and the follower pins 29 to translate the securement member telescopically outward along the spool core will, in turn, move the drive lugs out of the radial slots 87 to uncouple the securement member from the flange 43. Preferably, the respective end faces of the drive lugs 82 are suitably inclined to facilitate their movement out of the radial slots 87 without tearing the flange 43.

The invention has been described with reference to a preferred embodiment. However, it will be appreciated that variations and modifications can be effected within the ordinary skill in the art without departing from the scope of the invention.

We claim:

1. A film cassette comprising (a) a spool rotatable in a film unwinding direction to thrust a leader section of a film roll coiled about said spool to the exterior of said cassette and in a film winding direction to return said leader to the interior of the cassette, and (b) a pair of flanges coaxially arranged along said spool to normally permit each of said flanges to be independently rotated relative to the spool in the film unwinding and film winding directions and to radially confine said film roll within skirted peripheries of the flanges, is characterized by including:

a pair of disks axially spaced along said spool in a fixed relation to the spool, with respective outer faces of said disks located adjacent corresponding inner faces of said flanges to position the disks within said skirted peripheries of the flanges to include said film roll between said disks; and securement means for securing one of said flanges in face-to-face contact to one of said disks to make the flange rotate in unity with said spool when the spool is rotated in the film unwinding direction, to improve the ability of the spool to thrust said leader from said cassette, and for releasing the flange from the disk to permit the flange to be independently rotated relative to said spool when the spool is rotated in the film winding direction, to substantially ensure said leader can be rewound within said skirted periphery of the flange.

2. A film cassette as recited in claim 1, wherein said securement means includes a securement member movable relative to said spool for clamping one of said flanges to one of said disks to secure the flange frictionally in face-to-face contact to the disk and for unclamping the flange from the disk to release the flange from the disk.

3. A film cassette as recited in claim 1, wherein one of said flanges may be shifted axially against one of said disks to secure the flange in face-to-face contact to the disk, and said securement member is movable relative to said spool in respective opposite directions to clamp one of said flanges axially against one of said disks and to unclamp the flange from the disk.

4. A film cassette as recited in claim 1, wherein one of said flanges may be shifted axially against one of said disks to secure the flange in face-to-face contact to the disk, said securement member is coaxially arranged with respect to said spool for rotation relative to the spool in the film unwinding and film winding directions and for translation along the spool, and said spool and said securement member have cooperating camming elements for translating the securement member in opposite directions along the spool to clamp one of said flanges axially against one of said disks responsive to rotation of the securement member relative to the spool in the film unwinding direction and to unclamp the flange from the disk responsive to rotation of the securement member relative to the spool in the film winding direction.

5. A film cassette as recited in claim 4, wherein said securement member includes drive means for affirmatively coupling with one of said flanges to rotate the flange in the film unwinding direction should the flange be forcibly rotated relative to the securement member in that direction when the flange is clamped axially against one of said disks and for uncoupling from the flange responsive to rotation of the securement member relative to the flange in the film winding direction to permit the flange to be independently rotated in that direction when the flange is unclamped from the disk.

* * * * *